Patented Feb. 17, 1925.

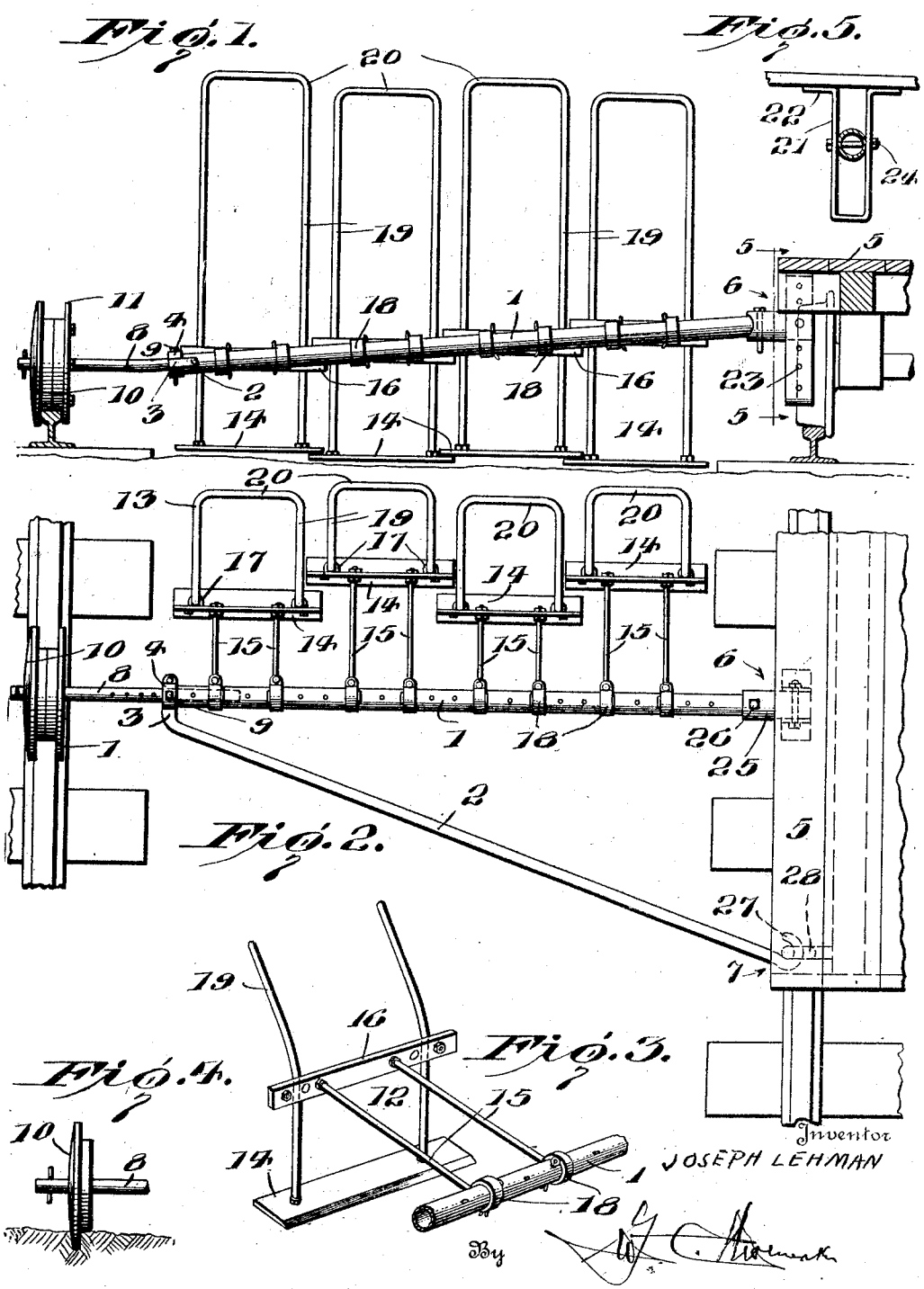

1,526,712

UNITED STATES PATENT OFFICE.

JOSEPH LEHMAN, OF FREMONT, NEBRASKA.

WEED CUTTER.

Application filed August 21, 1923. Serial No. 658,648.

*To all whom it may concern:*

Be it known that I, JOSEPH LEHMAN, a citizen of the United States, residing at Fremont, in the county of Dodge and State of Nebraska, have invented new and useful Improvements in Weed Cutters, of which the following is a specification.

The invention relates to improvements in weed cutters.

The object of the present invention is to provide a simple, practical and efficient weed cutter of strong, durable and comparatively inexpensive construction designed for cutting the weeds along a railway both between the tracks and at the outer sides thereof and capable of being readily applied to and carried by a hand-car along the railway and equipped with a plurality of manually controlled independently operable weed cutting units whereby the grass and weeds may be effectively removed from the roadbed and at the sides of the same.

A further object of the invention is to provide a weed cutter of this character in which the number of manually operable weed cutting units may be varied to adapt the weed cutter to the width of the space to be cleared of weeds.

It is also an object of the invention to provide weed cutting units so constructed and arranged as to enable each operator to conveniently control a unit with each hand.

With these and other objects in view the invention consists in the construction and novel combination and arrangement of parts hereinafter fully described, illustrated in the accompanying drawings and pointed out in the claims hereto appended, it being understood that various changes in the form, proportion and minor details of construction, within the scope of the claims, may be resorted to without departing from the spirit or sacrificing any of the advantages of the invention.

In the drawing, in which like characters of reference designate corresponding parts in the several views:—

Figure 1 is a front elevation partly in section of a weed cutter, constructed in accordance with this invention and shown applied to a hand car.

Figure 2 is a plan view, taken longitudinally of the laterally projecting frame.

Figure 3 is a detail perspective view of one of the weed cutting units.

Figure 4 is a detail view of the wheel, the inner disk being removed.

Figure 5 is a detail fragmentary view of the main frame supporting bracket, showing the main frame member in section.

In the accompanying drawing, in which is illustrated the preferred embodiment of the invention, the weed cutter comprises in its construction a hinged frame composed of a tubular supporting member 1 and a bracing frame member 2 arranged at a slight angle to the tubular supporting member 1 and connected at its outer end with the outer end of the same by an arm 3 having a sleeve 4 embracing the outer end of the tubular supporting member 1. The frame members 1 and 2, which converge outwardly slightly, are mounted on a hand-car 5 by suitable hinged connections 6 and 7, which may be of any desired construction and which permits the laterally extending frame to swing upwardly and downwardly. The supporting member 1 is arranged at right angles to the line of movement of the hand-car and the tubular member 1 is adapted to receive a shaft 8 telescoping within the tubular member and adjustably secured to the same by means of a suitable fastening device 9 to enable a wheel 10, carried by the outer end of the shaft, to be arranged the desired distance from the hand-car 5 for running upon the inner rail of the adjacent track or upon the ground at the outer side of the track on which the hand-car is placed. The wheel 10 may be of any desired construction, and one or both of the flanges may consist of a disk 11 bolted or otherwise secured to the wheel. This will enable the disk 11 to be removed when not desired for use, as for instance when the weed cutter is employed for cutting the weeds at the side of the roadbed. The hinged connections 6 and 7 will enable the weed cutter to be readily swung upwardly out of the way of a passing train, or for carrying the weeder out of engagement with the roadbed in spots or sections where there are no weeds.

The supporting member 1 is equipped with a plurality of weed cutting units which comprises a hinged combined guide and bearing bracket 12 and an adjustable cutter carrying frame 13 provided with a blade 14 arranged in substantially horizontal position and adapted to be carried over the ground by the laterally projecting frame for cutting weeds, grass and other vegetation occurring between the tracks or at the sides of the same. The hinged bracket 12, which may be of any desired construction, as illustrated in the accompanying drawing is composed of spaced parallel arms 15 and a transverse connected bar 16 provided with eyes 17, forming guide members through which passes the cutter carrying frame. The arms 15 are provided with bearing sleeves 18 arranged on the tubular member 1 and retained in proper position thereon by means of cotter pins or other suitable fastening devices. The blade carrying frame is preferably U-shaped and consists of parallel relatively long curved legs 19 and a connecting top handle portion 20 by means of which the weed cutting unit is controlled and which is adapted to be readily grasped with either hand. The eyes 17 may consist of U bolts or any other suitable means and they adjustably secure the cutter frame to the hinged bracket and enable the weed cutting blade 14 to be arranged in proper position with relation to the lateral movement of the frame for acting effectively in cutting the weeds. The weed cutting units are removably arranged on the supporting member 1 and their number may be varied for providing a weed cutter of the required width for cutting the weeds between the tracks or at the outer sides of the same, and in practice an operator will control a pair of weed cutting units by holding one of the cutter frames in each hand and as the hinged frames are movable on the supporting member 1 the blades may be raised or lowered as required. Any other suitable means may, of course, be employed for hinging the weed cutting units to the laterally projecting frame. In practice the weed cutter is carried by the hand-car along the track, either between two tracks or at either side of the roadbed and the blades will effectively cut the weeds and other growth and enable the roadbed to be quickly cleared of growing vegetation and easily maintained in proper condition.

The hinge connection 6 preferably comprises a vertical bracket 21 composed of parallel sides and a connecting bottom portion, the upper terminals 22 of the sides being bent laterally to form attaching portions, which are suitably secured to the hand-car. The sides of the bracket are provided at intervals with aligned perforations 23 for the reception of a pivot 24, preferably consisting of a bolt which passes through the sides of the bracket and through a tubular coupling section 25, in which the inner end of the tubular member 1 is secured by a pin 26. The hinge connection 7 of the brace or stay rod 2 preferably consists of a hook 27 and an eye 28. The hook is formed on the end of the brace or stay rod and is arranged in an approximately horizontal position to permit the upward and downward swinging movement of the device.

What is claimed is:—

1. A weed cutter of the character described comprising a frame consisting of a bar, means whereby to mount the bar at its inner end on a car, a bracket adjustably supported in a substantially horizontal plane from the bar and having guide members on the front thereof, an inverted substantially U-shaped frame including legs and having its legs freely slidably vertically in the guide members, said frame being adapted to be raised or lowered and supported by the hand, and a cutter carried by the lower ends of the legs of said frame whereby the cutter is held manually at various distances from the ground.

2. A weed cutter of the character described comprising a frame consisting of a bar, means whereby to connect the bar on a car, a bracket consisting of spaced arms having bearing sleeves at their inner ends mounted on said bar and a plate connecting the outer ends of said arms and having guide members, an inverted substantially U-shaped frame having legs freely slidable vertically in said guide members and a cutter carried by the lower ends of the legs of said frame.

3. A weed cutter of the character described comprising a frame consisting of a tubular bar, a plurality of brackets secured to the bar and extending substantially horizontally therefrom, each bracket being provided with a pair of guide members, and frames each having parts slidable vertically in the respective pairs of guide members of the respective brackets and each frame member provided with a weed cutting blade at its lower end, each frame being adapted to be manipulated by hand to raise or lower the same and to hold the same and the blade at various distances from the ground, the blades being arranged in staggered relation.

4. A weed cutter of the character described, comprising a frame including a tubular bar adapted to be secured to the side of a car, a wheel having an axle telescoping into the outer end of said tubular bar, a plurality of brackets secured to the bar, each bracket consisting of parallel arms secured at their inner ends to said bar and a plate connecting the outer ends of each set of parallel arms, each plate having a pair of guide members and an inverted substantial U-shaped frame, one for each bracket, each frame having parts slidable in the guides of the respective bracket plates, a weed cutting blade carried by each of said frames, the blades being arranged in staggered relation.

5. A weed cutter of the character described comprising a bar, means whereby to mount the inner end of the bar on the side of a car, a bracket detachably secured to the bar and including a plate provided with a pair of guide members, a frame including spaced substantially parallel curved legs, and a cutter carried by the lower ends of said legs, the legs being freely slidable in said guide members whereby to permit the frame and cutter to be raised or lowered at will.

In testimony whereof I have hereunto set my hand.

JOSEPH LEHMAN.